US006067028A

United States Patent [19]
Takamatsu

[11] Patent Number: 6,067,028
[45] Date of Patent: May 23, 2000

[54] IDENTIFICATION SIGNAL REGISTERING METHOD AND IDENTIFICATION SIGNAL REGISTERING APPARATUS

[75] Inventor: Hiroyuki Takamatsu, Kanagawa, Japan

[73] Assignee: Sony Corporation, Tokyo, Japan

[21] Appl. No.: 08/854,166

[22] Filed: May 9, 1997

[30] Foreign Application Priority Data

May 20, 1996 [JP] Japan .................................. 8-124843

[51] Int. Cl.[7] ........................................ G06F 7/04

[52] U.S. Cl. ............................ 340/825.31; 340/825.69; 340/825.72; 340/10.1; 341/176; 380/23; 380/28

[58] Field of Search ........................ 340/825.31, 825.69, 340/825.72, 825.54, 10.1; 341/176; 380/23, 28

[56] References Cited

U.S. PATENT DOCUMENTS

| | | | |
|---|---|---|---|
| 4,509,093 | 4/1985 | Stellberger | 340/825.31 |
| 4,764,981 | 8/1988 | Miyahara et al. | 340/825.72 |
| 4,990,906 | 2/1991 | Kell et al. | 340/825.31 |
| 5,416,471 | 5/1995 | Treharne et al. | 340/825.31 |
| 5,420,925 | 5/1995 | Michaels | 380/23 |
| 5,473,318 | 12/1995 | Martel | 340/825.31 |
| 5,733,047 | 3/1998 | Furuta et al. | 380/28 |

*Primary Examiner*—Brian Zimmerman
*Assistant Examiner*—Yves Dalencourt
*Attorney, Agent, or Firm*—Frommer Lawrence & Haug, LLP.; William S. Frommer

[57] ABSTRACT

An identification signal registering method of registering an identification signal used for a detecting apparatus to identify an apparatus to be detected, includes a step of transmitting a communication request signal from a remote control apparatus having an inherent identification signal to the detecting apparatus, a step of receiving the communication request signal by the detecting apparatus and transmitting a random number signal therefrom to the remote control apparatus, a step of receiving the random number signal by the remote control apparatus and encrypting the inherent identification signal by using the random number signal to transmit it therefrom to the detecting apparatus, a step of receiving and decrypting the encrypted inherent identification signal by the detecting apparatus, a step of, if the decrypted inherent identification signal coincides with an identification signal previously stored in the detecting apparatus, setting the detecting apparatus in its mode for registering an identification signal of the apparatus to be detected, and a step of, in the registration mode, transmitting the identification signal from the apparatus to be detected to the detecting apparatus to register this identification signal in the detecting apparatus.

6 Claims, 6 Drawing Sheets

IDENTIFICATION SIGNAL REGISTERING METHOD AND IDENTIFICATION SIGNAL REGISTERING APPARATUS

BACKGROUND OF THE INVENTION

The present invention relates to an identification signal registering method and an identification signal registering apparatus which are suitable for use in registration of an identification signal used for a lock apparatus (detecting apparatus) of a keyless entry system, for example, to identify a key apparatus (apparatus to be detected).

A keyless entry system has been proposed. In this keyless entry system, infrared rays or radio waves are used to transmit an identification signal from a key apparatus side to a lock apparatus side for the locking or the unlocking thereof.

In the keyless entry system, when a user wants to add a key apparatus thereto and when he loses a key apparatus and hence intends to make an identification signal of the key apparatus ineffective, if the system is a keyless entry system in which a user, for example, cannot register an identification signal of a key apparatus with a lock apparatus or cannot erase it therefrom, then it is necessary to ask an expert to register or erase the key apparatus and hence time and costs therefor becomes problematic.

On the other hand, in a keyless entry system in which the user can register an identification signal of a key apparatus with a lock apparatus or can erase it therefrom, even a third party can comparatively easily register the identification signal of the key apparatus with a lock apparatus or can erase it therefrom, which leads to the problem in security.

SUMMARY OF THE INVENTION

In view of such aspects, it is therefore an object of the present invention to allow a user to register an identification signal of a key apparatus (apparatus to be detected) with a lock apparatus or erase it therefrom with ease and security.

According to an aspect of the present invention, an identification signal registering method of registering an identification signal used for a detecting apparatus to identify an apparatus to be detected, includes a step of transmitting a communication request signal from a remote control apparatus having an inherent identification signal to the detecting apparatus, a step of receiving the communication request signal by the detecting apparatus and transmitting a random number signal therefrom to the remote control apparatus, a step of receiving the random number signal by the remote control apparatus and encrypting the inherent identification signal by using the random number signal to transmit it therefrom to the detecting apparatus, a step of receiving and decrypting the encrypted inherent identification signal by the detecting apparatus, a step of, if the decrypted inherent identification signal coincides with an identification signal previously stored in the detecting apparatus, setting the detecting apparatus in its mode for registering an identification signal of the apparatus to be detected, and a step of, in the registration mode, transmitting the identification signal from the apparatus to be detected to the detecting apparatus to register this identification signal in the detecting apparatus.

DESCRIPTION OF THE PREFERRED EMBODIMENT

An identification signal registering method and an identification signal registering apparatus according to an embodiment of the present invention will be described with reference to the accompanying drawings.

Initially, a keyless entry system to which the present invention is applied will be described with reference to FIGS. 1, 2 and 3A to 3D, by way of example.

Figure 1:
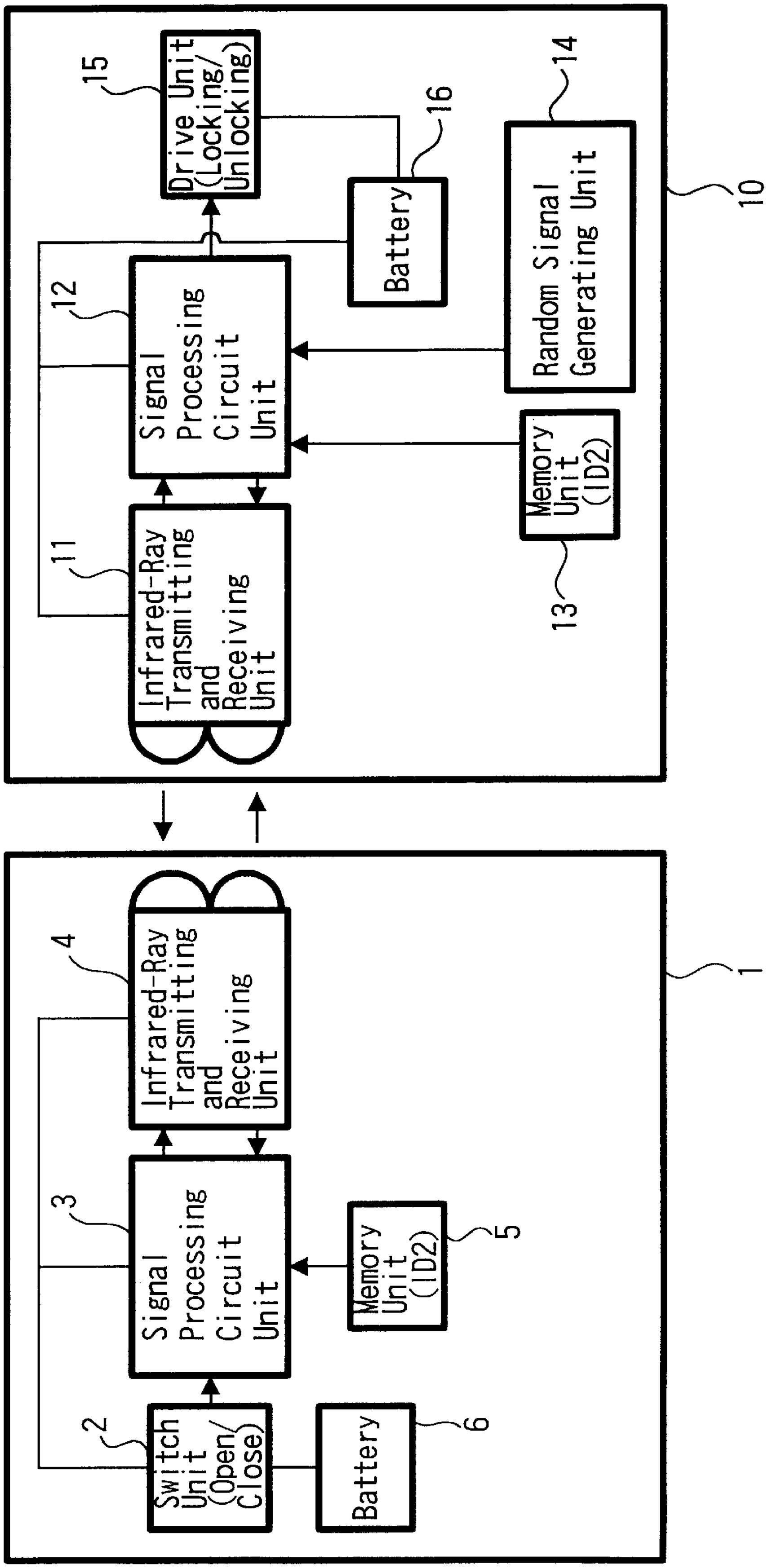
FIG. 1 is a block diagram showing an arrangement of a keyless entry system to which an identification signal registering apparatus according to an embodiment of the present invention is applied.

As shown in FIG. 1, a portable key apparatus 1 (an apparatus to be detected) has a switch unit 2 for issuing commands to open and close a door, a signal processing circuit unit 3, an infrared-ray transmitting and receiving unit 4 for communicating with a lock apparatus (detecting apparatus) 10 described later on, and a memory unit 5 for storing a specific (own) identification signal ID.

The signal processing circuit unit 3 is formed of a microcomputer. When the switch unit 2 issues a command to open or close the door by operating a switch thereof, the signal processing circuit unit 3 receives the command and generates a communication request signal including a lock/unlock command signal and supplies this communication request signal to the infrared-ray transmitting and receiving unit 4. The infrared-ray transmitting and receiving unit 4 transmits the communication request signal to the lock apparatus 10 on the infrared rays.

When the key apparatus 1 receives a random number signal X formed of 24 bits, for example, from the lock apparatus 10, the signal processing circuit unit 3 thereof encrypts a specific (own) identification signal ID2 of 24 bits, for example, stored in the memory unit 5 to convert it into a code signal of 24 bits, for example, in accordance with a predetermined function f(X, ID2) by using the 24-bit random number signal X. Then, the key apparatus 1 supplies the encrypted signal f(X, ID2) to the lock apparatus 10 through the infrared-ray transmitting and receiving unit 4.

This function f(X, ID2) is defined as shown below, for example, such that if respective corresponding bits of the random number signal X and the identification signal ID2 have the same value of "1" or "0", then the value of a corresponding bit in the function is set to "1" and if the respective corresponding bits have the values different from each other, then the value thereof in the function is set to "0".

| | | | | | | | | | | | | | | | | | | | | | | | | |
|---|---|---|---|---|---|---|---|---|---|---|---|---|---|---|---|---|---|---|---|---|---|---|---|---|
| ID2 | 0 | 1 | 0 | 1 | 0 | 1 | 0 | 1 | 0 | 1 | 0 | 1 | 0 | 1 | 0 | 1 | 0 | 1 | 0 | 1 | 0 | 1 | 0 | 1 |
| X | 1 | 1 | 0 | 1 | 1 | 1 | 0 | 1 | 1 | 1 | 0 | 1 | 1 | 1 | 0 | 1 | 1 | 1 | 0 | 1 | 1 | 1 | 0 | 1 |
| f(X, ID2) | 0 | 1 | 1 | 1 | 0 | 1 | 1 | 1 | 0 | 1 | 1 | 1 | 0 | 1 | 1 | 1 | 0 | 1 | 1 | 1 | 0 | 1 | 1 | 1 |

The infrared-ray transmitting and receiving unit 4 according to this embodiment is arranged so as to carry out communication in accordance with a known base band system. The base band system permits high-speed communication at a lower consumed power and simplifies a circuit arrangement as compared with other modulation systems such as an amplitude shift keying (ASK), a frequency shift keying (FSK) or the like.

The lock apparatus 10 is provided at a predetermined position in association with the door. The lock apparatus 10 has an infrared-ray transmitting and receiving unit 11 for communicating with the key apparatus 1, a signal processing circuit unit 12, a memory unit 13 for storing a specific (own) identification signal ID2, a random number generating unit 14 for generating the random number signal, and a drive unit 15 for controlling a door locking or unlocking operation based on a command signal from the signal processing circuit unit 12.

A binary counter for processing 24 bits, for example, is employed as the random number generating unit 14. This 24-bit binary counter carries out a count operation in accordance with a predetermined clock signal regardless of the communication. When the lock apparatus 10 receives the communication request signal from the key apparatus 1, the operation of the 24-bit binary counter is stopped and then a count value of the binary counter at this time is read, thereby the 24-bit random number signal, for example, being obtained.

The signal processing circuit unit 12 is formed of a microcomputer. When the lock apparatus 10 receives the communication request signal from the key apparatus 1, the signal processing circuit unit 12 transmits the random number signal X generated by the random number generating unit 14 from the lock apparatus 10 to the key apparatus 1 through the infrared-ray transmitting and receiving unit 11.

When the lock apparatus receives from the key apparatus 1 the encrypted signal f(X, ID2) obtained by encrypting the identification signal ID2 with the random number signal X, the signal processing circuit unit 12 thereof decrypts the received encrypted signal f(X, ID2) in accordance with a predetermined function $f^{-1}\{f(X, ID2), X\}$ by using the previously transmitted 24-bit random number signal, for example, and checks whether or not the identification signal obtained by this decryption coincides with the specific (own) identification signal ID2 previously stored (registered) in the memory unit 13.

As a result of the check processing, if the decrypted identification signal coincides with the identification signal ID2 previously stored (registered), then the signal processing circuit unit 12 supplies a locking/unlocking command signal based on a door opening/closing command included in the communication request signal to the drive unit 15. Then, under the operation of the drive unit 15, the door is opened or closed.

The infrared-ray transmitting and receiving unit 11 according to this embodiment is arranged similarly to the above-mentioned infrared-ray transmitting and receiving unit 4, and arranged so as to carry out communication in accordance with the known base band system. In FIG. 1, batteries 6 and 16 are respectively used to energize the key apparatus 1 and the lock apparatus 10.

An operation of the keyless entry system for opening and closing a door according to this embodiment will be described with reference to FIG. 2 which is a flowchart therefor and with reference to FIGS. 3A to 3D which are timing charts therefor. In this embodiment, it is assumed that the same specific (own) identification signals ID2, e.g., the identification signals formed of codes of 24 bits, for example, are previously stored (registered) in the memory units 5 and 13, respectively.

Figure 2:
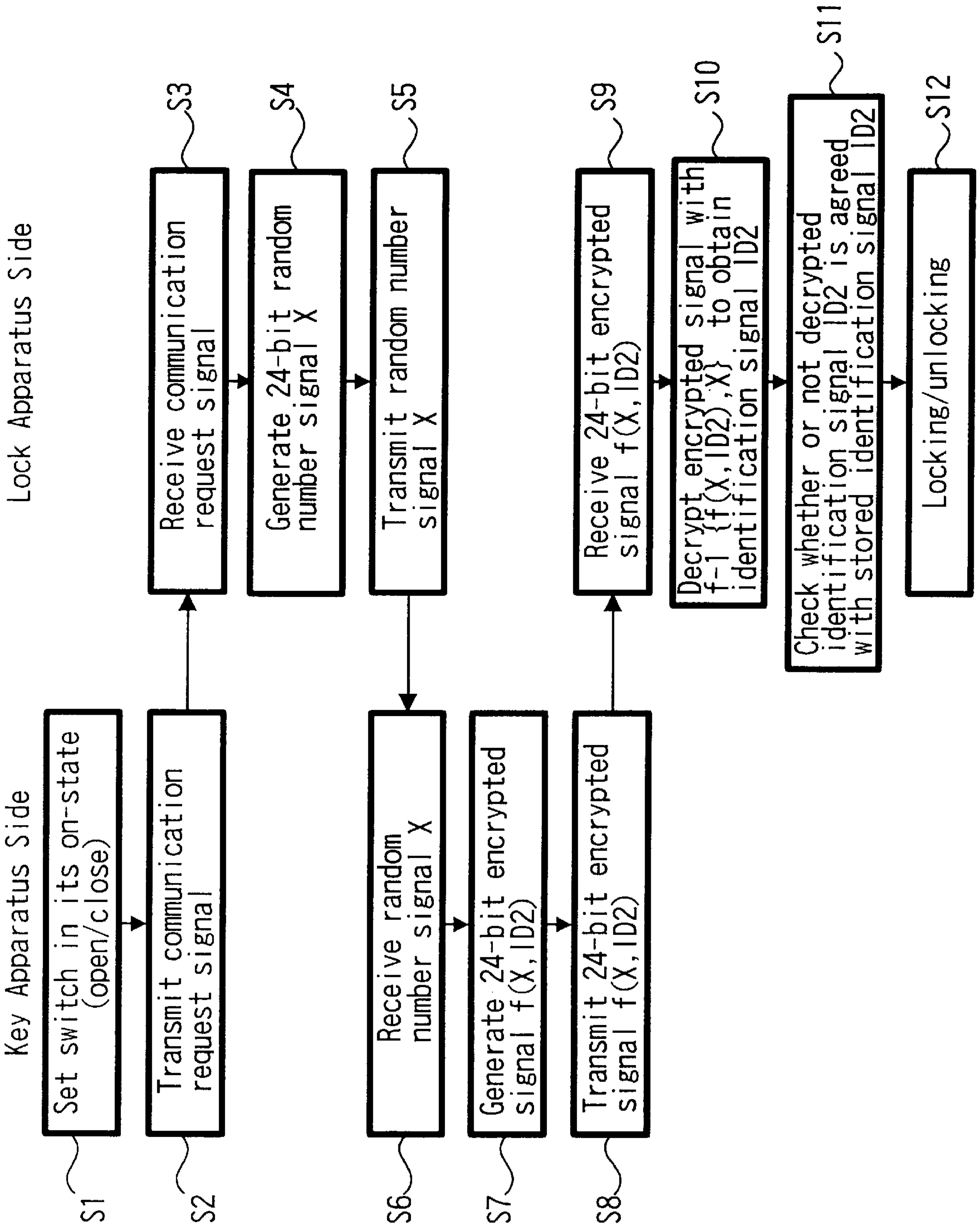
FIG. 2 is a flowchart used to explain an operation of the keyless entry system shown in FIG. 1.

In step S1 of the flowchart shown in FIG. 2, the switch unit 2 of the key apparatus 1 is operated and the switch thereof is set in its on-state, thereby a command to open or close a door being issued. In step S2, as shown in FIG. 3A, for example, the key apparatus 1 transmits the communication request signal including the door opening/closing command signal to the lock apparatus 10 for a period of 100 ms.

Figures 3A, 3B, 3C, 3D:
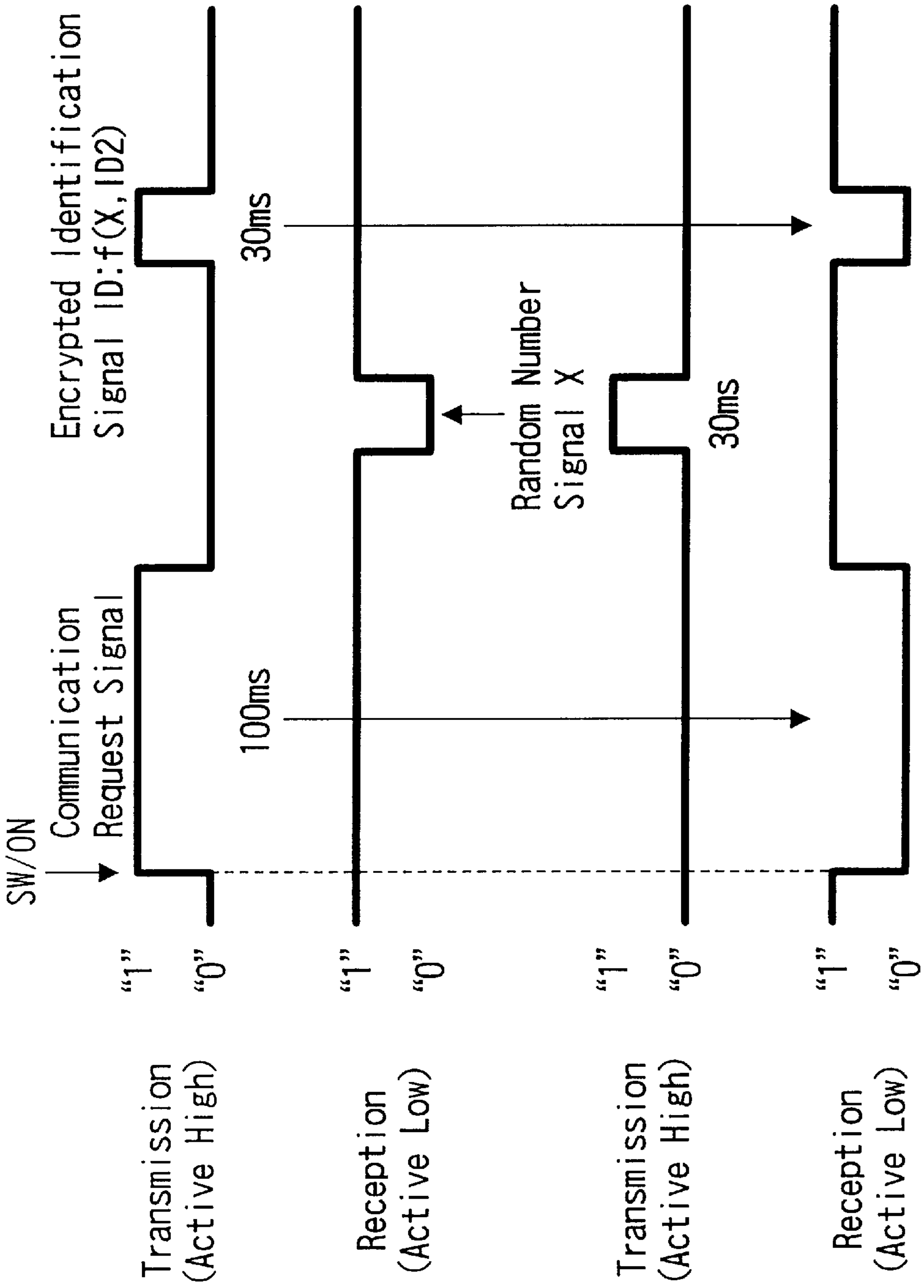
FIGS. 3A to 3D are timing charts used to explain communication between a key apparatus and a lock apparatus of the keyless entry system shown in FIG. 1.

In step S3, the lock apparatus 10 receives the communication request signal as shown in FIG. 3D. Then, the processing proceeds to step S4, wherein, as shown in FIG. 3C, the lock apparatus 10 obtains the 24-bit random number signal X, for example, generated by the random signal generating unit 14. In step S5, as shown in FIG. 3C, the lock apparatus 10 transmits the random number signal X to the key apparatus 1 for a period of 30 ms, for example.

In step S6, the key apparatus 1 receives the random number signal X as shown in FIG. 3B. Then, the processing proceeds to step S7, wherein the key apparatus 1 encrypts the specific (own) identification signal ID2 stored (registered) in the memory unit 5 to convert it into the 24-bit code signal, in accordance with the predetermined function f(X, ID2) by using the 24-bit random number signal X, for example, and then obtains the encrypted signal f(X, ID2). Then, the processing proceeds to step S8, wherein the key apparatus 1 transmits the encrypted signal f(X, ID2) to the lock apparatus 10 during the period of 30 ms, for example, as shown in FIG. 3A.

In step S9, the lock apparatus 10 receives the encrypted signal f(X, ID2) as shown in FIG. 3D. Then, the processing proceeds to step S10, wherein the lock apparatus 10 decrypts the received encrypted signal f(X, ID2) in accordance with the predetermined function $f^{-1}\{f(X, ID2), X\}$ by using the previously transmitted random number signal X. Then, the processing proceeds to step S11, wherein the lock apparatus 10 checks whether or not the decrypted identification signal ID2 coincides with the specific (own) identification signal ID2 previously stored (registered) in the memory unit 13. As a result of the check processing, if the decrypted identification signal ID2 coincides with the specific (own) identification signal ID2 previously stored (registered) in the memory unit, then, in accordance with the door opening or closing command signal of the communication request signal, the signal processing circuit unit 12 supplies the unlocking or locking command signal to the drive unit 15 for carrying out the unlocking or locking operation of the door. Then, under the control of the drive unit, the door is opened or closed.

According to this embodiment, every time when the operation of opening or closing the door is attempted, the lock apparatus 10 generates the random number signal X while the key apparatus 1 encrypts the identification signal ID2 by using the random number signal X and transmits the encrypted signal f(X, ID2) to the lock apparatus 10. Therefore, since the signals transmitted in this both-way communication are constantly different, even if these communication signals are intercepted, the specific (own) identification signal ID2 is prevented from being stolen.

According to this embodiment, even if the operation of opening or closing the door is attempted any times, the possibility that the code signals are agreed with each other by accident is constant, e.g., the possibility is constantly about one over 16.7 million in a case of the 24-bit code signal. Therefore, it is advantageously possible to realize the extremely high security with ease.

Further, the keyless entry system to which the identification signal registering method and the identification signal registering apparatus according to the embodiment of the present invention are applied will be described with reference to FIG. 4 which is a diagram showing an arrangement of the identification signal registering apparatus and with reference to FIGS. 5A and 5B which are flowcharts used to explain an operation thereof. In this keyless entry system, a switch thereof, the signal processing circuit unit 22 generates a communication request signal including a registration/erasure command signal and supplies this communication request signal to the infrared-ray transmitting and receiving unit 23. The infrared-ray transmitting and receiving unit 23 transmits the communication request signal to the lock apparatus 10.

When the remote control apparatus 20 receives a random number signal X formed of 24 bits, for example, from the lock apparatus 10, the signal processing circuit unit 22 encrypts a specific (own) identification signal ID1 of 24 bits, for example, stored in the memory unit 24 to convert it into a code signal of 24 bits, for example, in accordance with a predetermined function f(X, ID1) by using the random number signal X of 24 bits, for example. Then, the signal processing circuit unit 22 transmits the encrypted signal f(X, ID1) to the lock apparatus 10 through the infrared-ray transmitting and receiving unit 23.

This function f(X, ID1) is defined as shown below, for example, such that if respective corresponding bits of the random number signal X and the identification signal ID1 have the same value of "1" or "0", then the value of a corresponding bit in the function is set to "1" and if the respective corresponding bits have the values different from each other, then the value thereof in the function is set to "0".

| | | | | | | | | | | | | | | | | | | | | | | | | |
|---|---|---|---|---|---|---|---|---|---|---|---|---|---|---|---|---|---|---|---|---|---|---|---|---|
| ID1 | 0 | 1 | 0 | 1 | 0 | 1 | 0 | 1 | 0 | 1 | 0 | 1 | 0 | 1 | 0 | 1 | 0 | 1 | 0 | 1 | 0 | 1 | 0 | 1 |
| X | 1 | 1 | 0 | 1 | 1 | 1 | 0 | 1 | 1 | 1 | 0 | 1 | 1 | 1 | 0 | 1 | 1 | 1 | 0 | 1 | 1 | 1 | 0 | 1 |
| f(X, ID1) | 0 | 1 | 1 | 1 | 0 | 1 | 1 | 1 | 0 | 1 | 1 | 1 | 0 | 1 | 1 | 1 | 0 | 1 | 1 | 1 | 0 | 1 | 1 | 1 |

specific (own) identification signal ID2 registered (stored) in a key apparatus 1 is registered with or erase from a memory unit 13 of a lock apparatus 10 of the above keyless entry system. In FIG. 4, parts corresponding to those shown in FIG. 1 are marked with the same reference numerals and hence need not to be described in detail.

Figure 4:
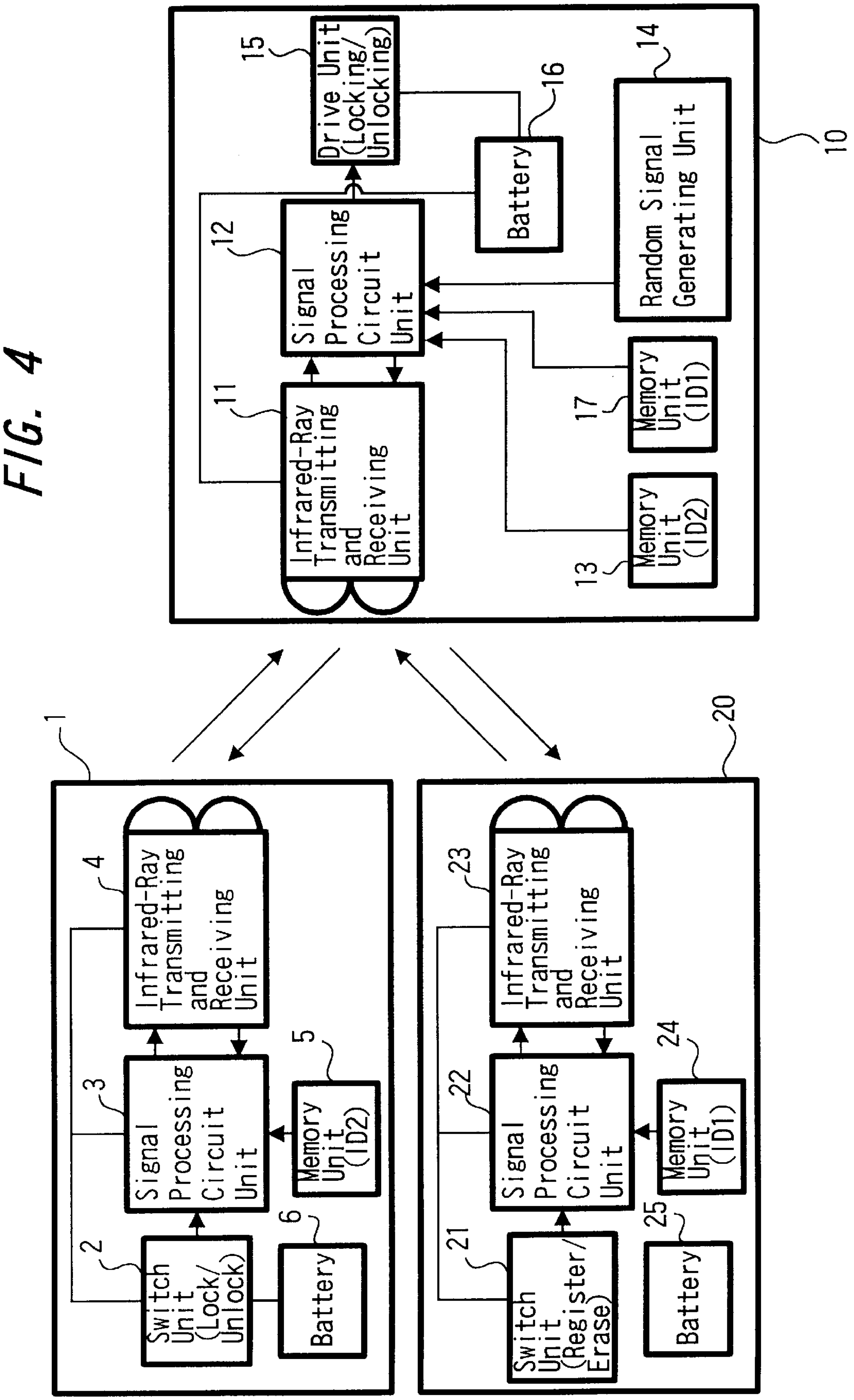
FIG. 4 is a block diagram showing an arrangement of the identification signal registering apparatus according to the embodiment of the present invention.

The key apparatus 1 and the lock apparatus 10 shown in FIG. 4 are arranged substantially similarly to those described with reference to FIG. 1, except that the lock apparatus 10 further has a memory unit 17 for registering (storing) an identification signal ID1 inherent in a remote control apparatus 20 for carrying out registration/erasure described later on. In this memory unit 17, the identification signal ID1 inherent in the remote control apparatus 20 is registered (stored).

A signal processing circuit unit 12 of the lock apparatus 10 is arranged so as to be brought in its mode for registering an identification signal ID2 with a memory unit 13 based on a communication request signal or the like from the remote control apparatus 20.

In this embodiment, the remote control apparatus 20 is provided so as to register or erase the identification signal. The remote control apparatus 20 has a switch unit 21 of issuing a command to register or erase an identification signal, a signal processing circuit unit 22, an infrared-ray transmitting and receiving unit 23 for communicating with the lock apparatus 10, and a memory unit 24 for storing the inherent identification signal ID1. A battery 25 is used to supply a power source.

The signal processing circuit unit 22 is formed of a microcomputer. When the switch unit 21 issues a commend to register or erase an identification signal by operating a The infrared-ray transmitting and receiving unit 23 according to this embodiment is arranged so as to carry out communication in accordance with a known base band system. The base band system permits high-speed communication at a lower consumed power and simplifies a circuit arrangement as compared with other modulation systems such as the ASK, the FSK or the like.

When the lock apparatus 10 receives from the remote control apparatus 20 the encrypted signal f(X, ID1) obtained by encrypting the identification signal ID1 of the remote control apparatus 20 with the random number signal X, the signal processing circuit unit 12 decrypts the received encrypted signal f(X, ID1) in accordance with a predetermined function $f^{-1}\{f(X, ID1), X\}$ by using the previously transmitted 24-bit random number signal X, for example, and checks whether or not the identification signal ID1 obtained by this decryption coincides with the specific (own) identification signal ID1 previously stored (registered) in the memory unit 17.

As a result of the check processing, if the decrypted inherent identification signal ID1 coincides with the inherent identification signal ID1 previously stored (registered) in the memory unit 17, then the signal processing circuit unit 12 changes its mode to a registration mode or erase the identification signal ID2 presently stored (registered) in the memory unit 13 based on the registration/erasure command signal included in the communication request signal.

An identification signal registration operation according to the embodiment shown in FIG. 4 will be described with reference to FIGS. 5A and 5B which are flowcharts therefor. In this embodiment, it is assumed that the same specific (own) identification signals ID1, e.g., the identification signals ID1 formed of codes of 24 bits, for example, are previously registered (stored) in the memory units 17 and 24, respectively. It is also assumed that the specific (own) identification signal ID2 is registered (stored) in the memory unit 5 of the key apparatus 1 but another identification signal or no identification signal is registered in the memory unit 13 of the lock apparatus 10.

Figure 5A:
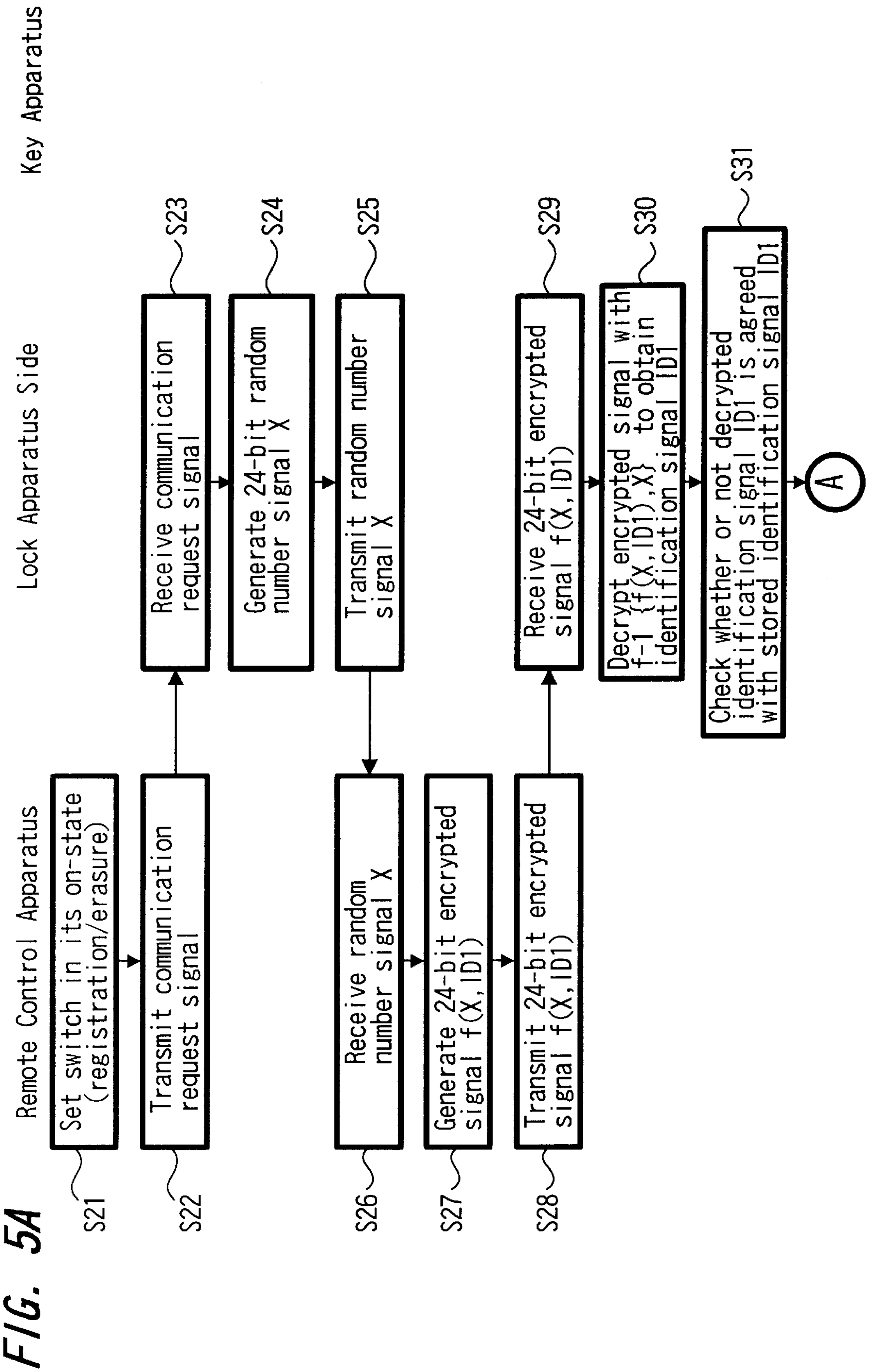
FIGS. 5A and 5B are flowcharts used to explain of an operation of the identification signal registering apparatus according to the embodiment of the present invention.
Figure 5B:
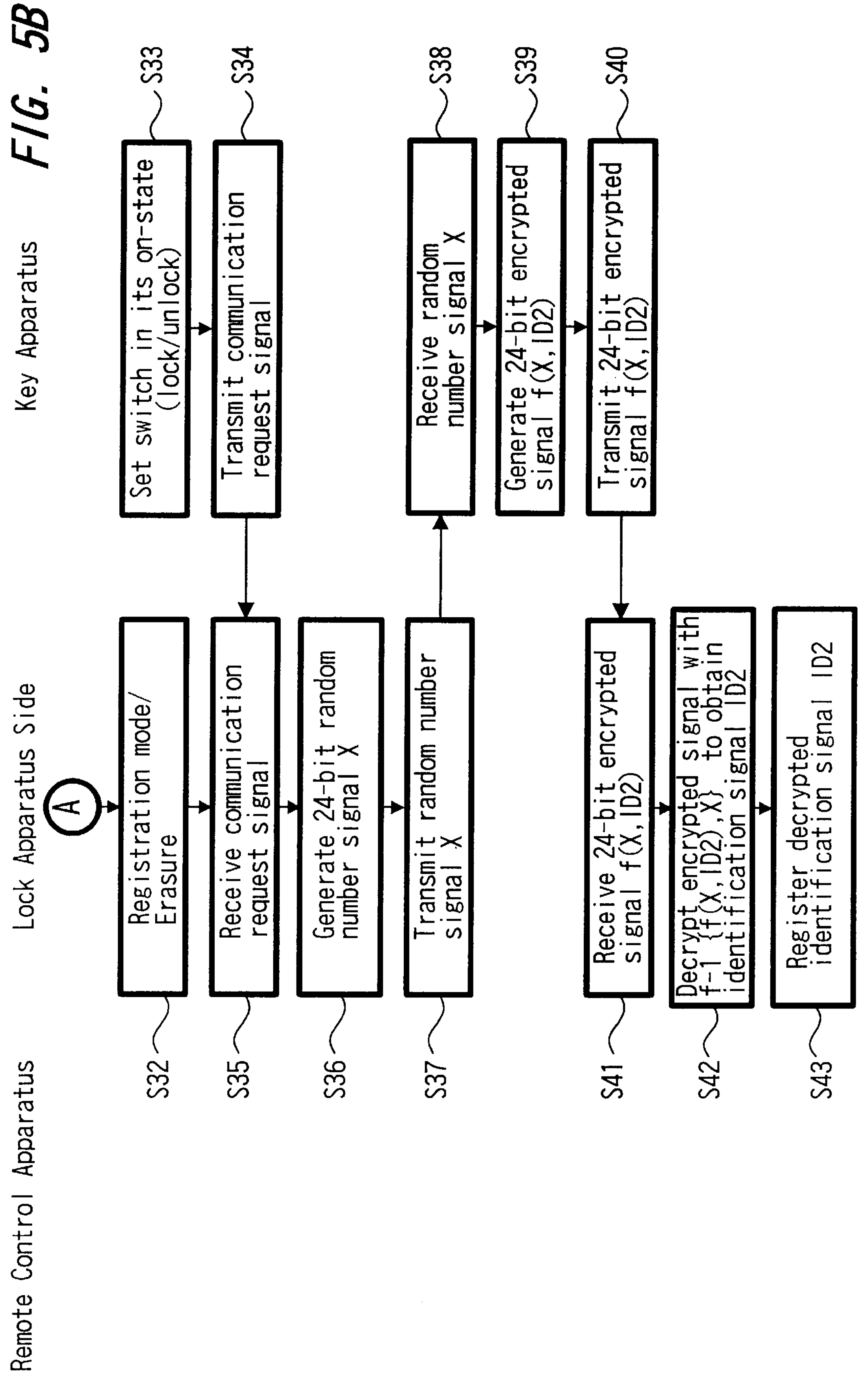

In step S21 of the flowchart shown in FIG. 5A, the switch unit 21 of the remote control apparatus 20 is operated and the switch thereof is set in its on-state, thereby a command to register an identification signal being issued. Then, the processing proceeds to step S22, wherein the remote control apparatus 20 transmits the communication request signal including the command signal for the registration to the lock apparatus 10.

In step S23, the lock apparatus 10 receives the communication request signal from remote control apparatus 20. Then, the processing proceeds to step S24, wherein the lock apparatus 10 obtains the 24-bit random number signal X, for example, generated by the random signal generating unit 14. In step S25, the lock apparatus 10 transmits the random number signal X to the remote control apparatus 20. Then, the processing proceeds to step S26.

In step S26, the remote control apparatus 20 receives the random number signal X from the lock apparatus 10. Then, the processing proceeds to step S27, wherein the remote control apparatus 20 encrypts the specific (own) identification signal ID1 stored (registered) in the memory unit 24 to convert it into the 24-bit code signal, in accordance with the predetermined function f(X, ID1) by using the 24-bit random number signal X, and then obtains the encrypted signal f(X, ID1). Then, the processing proceeds to step S28, wherein the remote control apparatus 20 transmits the encrypted signal f(X, ID1) to the lock apparatus 10. Then, the processing proceeds to step S29.

In step S29, the lock apparatus 10 receives the encrypted signal f(X, ID1), then the processing proceeds to step S30, wherein the lock apparatus 10 decrypts the received encrypted signal f(X, ID1) in accordance with the predetermined function $f^{-1}\{f(X, ID1), X\}$ by using the previously transmitted random number signal X. In step S31 of the flowchart shown in FIG. 5B, the lock apparatus 10 checks whether or not the decrypted identification signal coincides with the inherent identification signal ID1 previously stored (registered) in the memory unit 17. Then, the processing proceeds to step S32, wherein as a result of the check processing, if the decrypted identification signal ID1 coincides with the inherent identification signal ID1 previously stored (registered) in the memory unit 17, then, in accordance with the registration command signal of the communication request signal, the lock apparatus 10 is set in its registration mode.

In a state that the lock apparatus 10 is in its registration mode, in step S33, the switch unit 2 of the key apparatus 1 having the identification signal ID2 to be subsequently registered is operated and the switch thereof is set in its on-state. Then, in step S34, a communication request signal is transmitted from the key apparatus 1 to the lock apparatus 10.

In step S35, the lock apparatus 10 receives this communication request signal transmitted from the key apparatus 1. Then, the processing proceeds to step S36, wherein the lock apparatus 10 obtains the 24-bit random number signal X, for example, generated by the random number generating unit 14. The, the processing proceeds to step S37, wherein the lock apparatus 10 transmits the random number signal X to the key apparatus 1.

In step S38, the key apparatus 1 receives the random number signal X. Then, the processing proceeds to step S39, wherein the key apparatus 1 encrypts the specific (own) identification signal ID2 registered in the memory unit 5 to convert it into the 24-bit code in accordance with the predetermined function f(X, ID2) by using the 24-bit random number signal X, for example, and then obtains the encrypted signal f(X, ID2). In step S40, the key apparatus 1 transmits the encrypted signal f(X, ID2) to the lock apparatus 10.

In step S41, the lock apparatus 10 receives the encrypted signal f(X, ID2). Then, the processing proceeds to step S42, wherein the lock apparatus 10 decrypts the received encrypted signal f(X, ID2) in accordance with the predetermined function $f^{-1}\{f(X, ID2), X\}$ by using the previously transmitted random number signal X. Then, the processing proceeds to step S43, wherein the lock apparatus 10 registers the decrypted identification signal ID2 in the memory unit 13. In this case, if any other identification signal is already registered (stored) in the memory unit 13, then this identification signal is erased and then the specific (own) identification signal ID2 is registered (stored).

According to this embodiment, since any apparatus other than the remote control apparatus 20 having the inherent identification signal ID1 registered in the detecting apparatus (lock apparatus) 10 cannot register or erase the identification signal ID2 of the apparatus to be detected (key apparatus) 1, the identification signal ID2 can be prevented from being abused. Every time when the registration/erasure operation is attempted, the detecting apparatus 10 generates the random number signal. Therefore, since the signals transmitted in this both-way communication are constantly different, even if these communication signals are intercepted, the specific (own) identification signal ID2 is prevented from being stolen. Even if the registration/erasure operation is attempted many times, the possibility that the code signals are agreed with each other by accident is constant, e.g., the possibility is constantly about one over 16.7 million in a case f the 24-bit code signal.

Therefore, according to this embodiment, the identification signal registering apparatus and method can provide the advantage that only the user can easily register or erase the identification signal ID2 of the key apparatus 1 in the lock apparatus 10 with extremely high security.

While in this embodiment the communications between the key apparatus 1 and the lock apparatus 10 and between the lock apparatus 10 and the remote control apparatus 20 are carried out in accordance with the base band system by using the infrared rays, the communication may be carried out in accordance with some other modulation systems such as ASK, FSK or the like by using the infrared rays. It is needless to say that the communication may be carried out by using a radio wave or a supersonic wave instead of the infrared rays.

It is not necessary that each of the random number signal, the identification signal and the encrypted signal is formed of 24 bits. It is sufficient to determine the number of bits thereof in response to a required degree of the security.

According to this embodiment, since any apparatus other than the remote control apparatus having the inherent identification signal registered in the detecting apparatus (lock apparatus) cannot register or erase the identification signal of the apparatus to be detected (key apparatus), the identification signal can be prevented from being abused. Every time when the registration/erasure operation is attempted, the detecting apparatus generates the random number signal.

Therefore, since the signals transmitted in this both-way communication are constantly different, even if these communication signals are intercepted, the specific (own) identification signal is prevented from being stolen. Even if the registration/erasure operation is attempted any times, the possibility that the code signals are agreed with each other by accident is constant, e.g., the possibility is constantly about one over 16.7 million in a case f the 24-bit code signal.

Therefore, the present invention can provide the advantage that only the user can easily register or erase the identification signal of the apparatus to be detected in the detecting apparatus with extremely high security.

Having described a preferred embodiment of the present invention with reference to the accompanying drawings, it is to be understood that the present invention is not limited to the above-mentioned embodiment and that various changes and modifications can be effected therein by one skilled in the art without departing from the spirit or scope of the present invention as defined in the appended claims.

What is claimed is:

1. An identification signal registering method of registering an identification signal used for a detecting apparatus to identify an apparatus to be detected, comprising the steps of:

transmitting a communication request signal from said apparatus to be detected having a previously stored identification signal to said detecting apparatus;

receiving said communication request signal by the said detecting apparatus and transmitting a random number signal therefrom to said apparatus to be detected;

receiving said random number signal by said said apparatus to be detected and encrypting said previously stored identification signal by using said random number signal to transmit the encrypted previously stored identification signal therefrom to said detecting apparatus;

receiving and decrypting said encrypted previously stored identification signal by said detecting apparatus;

setting, if said decrypted previously stored identification signal coincides with an identification signal previously stored in said detecting apparatus, said detecting apparatus in its mode for registering an identification signal of said apparatus to be detected; and transmitting, in said registration mode, second identification signal which is different from said previously stored identification signal from said apparatus to be detected to said detecting apparatus to register this identification signal in said detecting apparatus.

2. An identification signal registering method according to claim 1, wherein before the identification signal of said apparatus to be detected is registered in said detecting apparatus, the identification signal previously stored in said detecting apparatus is erased.

3. An identification signal registering method according to claim 1, further comprising the steps of:

in said registration mode, transmitting a random number signal from said detecting apparatus to said apparatus to be detected;

encrypting, when said apparatus to be detected receives said random number signal, the identification signal of said apparatus to be detected by using said random number signal and then transmitting the encrypted identification signal therefrom to said detecting apparatus; and decrypting said encrypted identification signal by said detecting apparatus to registers said decrypted identification signal in said detecting apparatus.

4. An identification signal registering apparatus for registering an identification signal used for a detecting apparatus to identify an apparatus to be detected, comprising:

a means for transmitting a communication request signal from said apparatus to be detected having a previously stored identification signal to said detecting apparatus;

a means for receiving said communication request signal by the said detecting apparatus and transmitting a random number signal therefrom to said apparatus to be detected;

a means for receiving said random number signal by said apparatus to be detected and encrypting said previously stored identification signal by using said random number signal to transmit the encrypted previously stored identification signal therefrom to said detecting apparatus;

a means for receiving and decrypting said encrypted previously stored identification signal by said detecting apparatus;

a means for, if said decrypted previously stored identification signal coincides with an identification signal previously stored in said detecting apparatus, setting said detecting apparatus in its mode for registering an identification signal of said apparatus to be detected; and a means for, in said registration mode, transmitting a second identification signal which is different from said previously stored identification signal from said apparatus to be detected to said detecting apparatus to register this identification signal in said detecting apparatus.

5. An identification signal registering apparatus according to claim 4, wherein before the identification signal of said apparatus to be detected is registered in said detecting apparatus, the identification signal previously stored in said detecting apparatus is erased.

6. An identification signal registering apparatus according to claim 4, wherein in said registration mode, said detecting apparatus transmits a random number signal to said apparatus to be detected, when said apparatus to be detected receives said random number signal, said apparatus to be detected encrypts the identification signal thereof by using said random number signal and then transmits the encrypted identification signal to said detecting apparatus, and said detecting apparatus decrypts said encrypted identification signal and registers said decrypted identification signal in said detecting apparatus.

* * * * *